Figure 1:
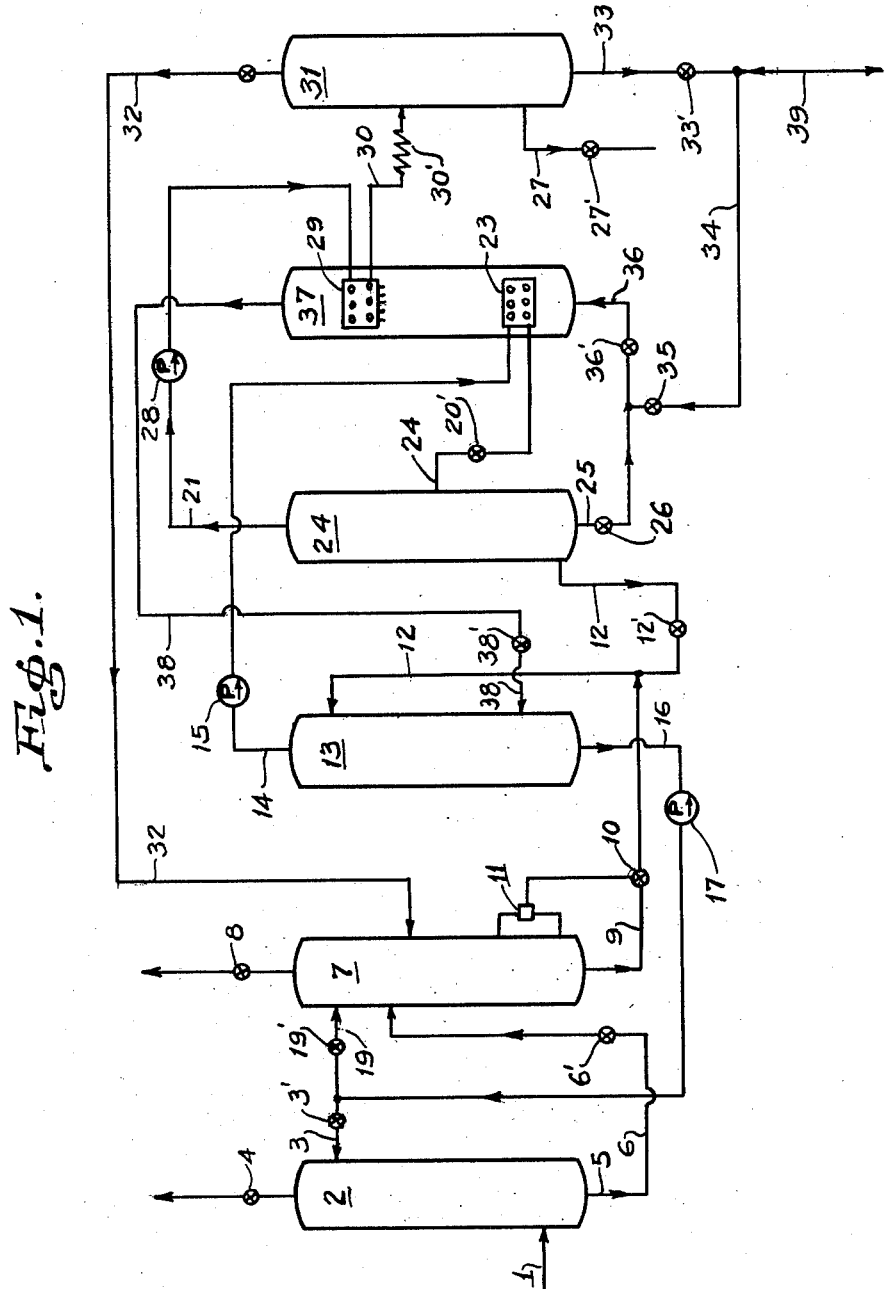

May 26, 1953          R. W. HEATH          2,640,008
ABSORPTION METHOD FOR SEPARATING HYDROCARBON GASES
Filed July 23, 1949          3 Sheets-Sheet 1

Inventor
RONALD W. HEATH
By
Attorney

Fig. 2.

May 26, 1953 R. W. HEATH 2,640,008
ABSORPTION METHOD FOR SEPARATING HYDROCARBON GASES
Filed July 23, 1949 3 Sheets-Sheet 3

INVENTOR.
BY Ronald W Heath
Philip Subkow

Patented May 26, 1953

2,640,008

UNITED STATES PATENT OFFICE 2,640,008

ABSORPTION METHOD FOR SEPARATING HYDROCARBON GASES

Ronald W. Heath, Long Beach, Calif., assignor to Signal Oil and Gas Company, Los Angeles, Calif., a corporation of Delaware Application July 23, 1949, Serial No. 106,364

15 Claims. (Cl. 196—8)

The problem of recovering gasoline, butane, and propane fractions from natural gas is in many places complicated by the fact that the fields from which such natural gas is produced are in arid or semi-arid regions where the large amount of water required for steam generation and cooling is not available at a suitable cost.

This problem can be visualized when it is remembered that in extracting gasoline, butane, and propane from natural gas, it is necessary to use a large volume of water in the form of process steam and large volumes of water as cooling water in cooling towers and in heat exchange coolers, and which is lost from the process. This large water requirement is simply not economically available in certain regions in Texas, New Mexico, Oklahoma, and California; that is, in practically all of the United States' oil producing territories.

As a result large quantities of such useful gasoline and lighter fractions are wasted daily in fields of such low gas production where present types of natural gas plants are simply not economical. This enormous loss to the nation has concerned many people, but to date no reasonably economic solution has, to the applicant's knowledge, been suggested. I have devised a system which is so economical in construction and operation that it may be used to process gas otherwise not economically treatable under present practice.

I have devised a system for the removal and recovery of gasoline and lighter fractions in which there is little or substantially no loss of water and in which no boilers or cooling towers need be employed.

My system relies on the economic fact that in such regions as previously referred to, while there is a lack of water, there is an abundance of fuel which, because it is being wasted, has little or no economic value. Nonetheless, my system is so economical in fuel that per gallon of gasoline the total power requirement is but a small fraction of that required in standard presently employed natural gasoline plants.

I employ the natural gas after removal of the gasoline to operate natural gas internal combustion engines and employ the heat in the circulating cooling water as part of my heat load in the process.

I also employ compressors operated by the natural gas engines to compress vapors and gases circulating in the system to cause a rise of temperature thereof to supply a portion or all of the heat load of the system. I can thus, if desired, avoid the use of fired heaters and boilers and thus avoid the operation of furnaces or flame operated units in the absorption and gasoline recovery units. The reduction in fire hazard in a locality which is short of water is also an important consideration.

I can employ air coolers to remove any excess heat not removed by suitable heat exchange process in the cycle to control temperatures in the circulating-operating stream. This is possible because I may employ relatively high temperature levels in the absorption cycle of my invention, which temperatures are above those normally employed in present practice. This reduces the water necessary for cooling and thus also avoids the loss of water by evaporation in cooling towers which would be a necessary consequence where water cooling is employed.

Summarizing my invention, I operate the fat oil still of a hydrocarbon absorption unit at a low pressure. I heat water in a water vaporizer which is connected to the still and operated at substantially the still pressure or at some higher pressure, such that the steam passes directly from the vaporizer. I recompress the vapors from the still and employ the heat of the vapors resulting from compression of the vapors to supply the latent heat load of vaporization of the water. I condense the gasoline from the recompressed vapors and recover the water which is thus at an elevated temperature suitable for recirculation to the water vaporization unit. By employing the still at a suitable low pressure, the latent heat of vaporization of the gasoline and other liquid fractions lowers the temperature of the unvaporized oil to a point where it may be recirculated without intermediate cooling directly into the absorption step. The fat oil from the absorber is then heated to a somewhat higher temperature for introduction into the still. In order to make further economies in heat, I may employ the heat in the engine water circulating from internal combustion engines, used in operating the pumps and compressors to supply part of the heat load in the system and may further provide heat exchange in the system. If I desire additional cooling, I may employ air coolers with fans operated by such engines. I may also employ the still vacuum to cause a stabilization of crude oil produced along with the natural gas and a simultaneous processing of the recovered gasoline lighter fractions along with such fractions recovered by absorption from the natural gas.

As a result of the foregoing and as will appear more fully from the following description of my invention, I am enabled to construct simple and, if desired, small plants for the separation of hydrocarbons from hydrocarbon gases in which I may dispense with atmospheric or force-draft water cooling towers and boilers and in which only a limited amount of heat exchange capacity is employed, obtaining the cooling necessary by means of air coolers. All drives may be obtained from gas engines, the heat in the cooling water, and the exhaust gases employed to impart heat at desired points in the cycle.

This cycle permits of the utilization of higher absorption oil to gas ratios in the absorbers than is now thought to be economical in the absorption systems used in the recovery of natural gas.

In present commercial practice, the major item of cost in construction and operation of natural gasoline plants is determined by the gas-oil ratio. Increase in the oil circulation rate increases the cooling surface required in heat exchangers and coolers and also the size of furnaces and cooling towers and the number and size of pumps, and in the matter of operating costs the increase in the pumping load results in a major item of increased cost.

In the system of the present invention, the increase in the oil circulation ratio results in but a minor increase in the cost of construction and operation far less than would be occasioned by a like increase in the cost in the case of prior art plants. Since such an increase means merely an increase in compressor equipment to handle the larger volume of steam required and the increased pumping load between the still and absorber is minor, the increased cost in my invention is also minor.

In view of the features above described, I may erect and operate such plants in fields in which the total volume of available gas or the expected life of the field is less than is thought economical with prior art plants.

While these features are thus economical in small plants, the features are also of value in large and more elaborate installations where the volume of gas to be treated or the expected life of the field makes such larger and more elaborate plants economical.

Figure 3:
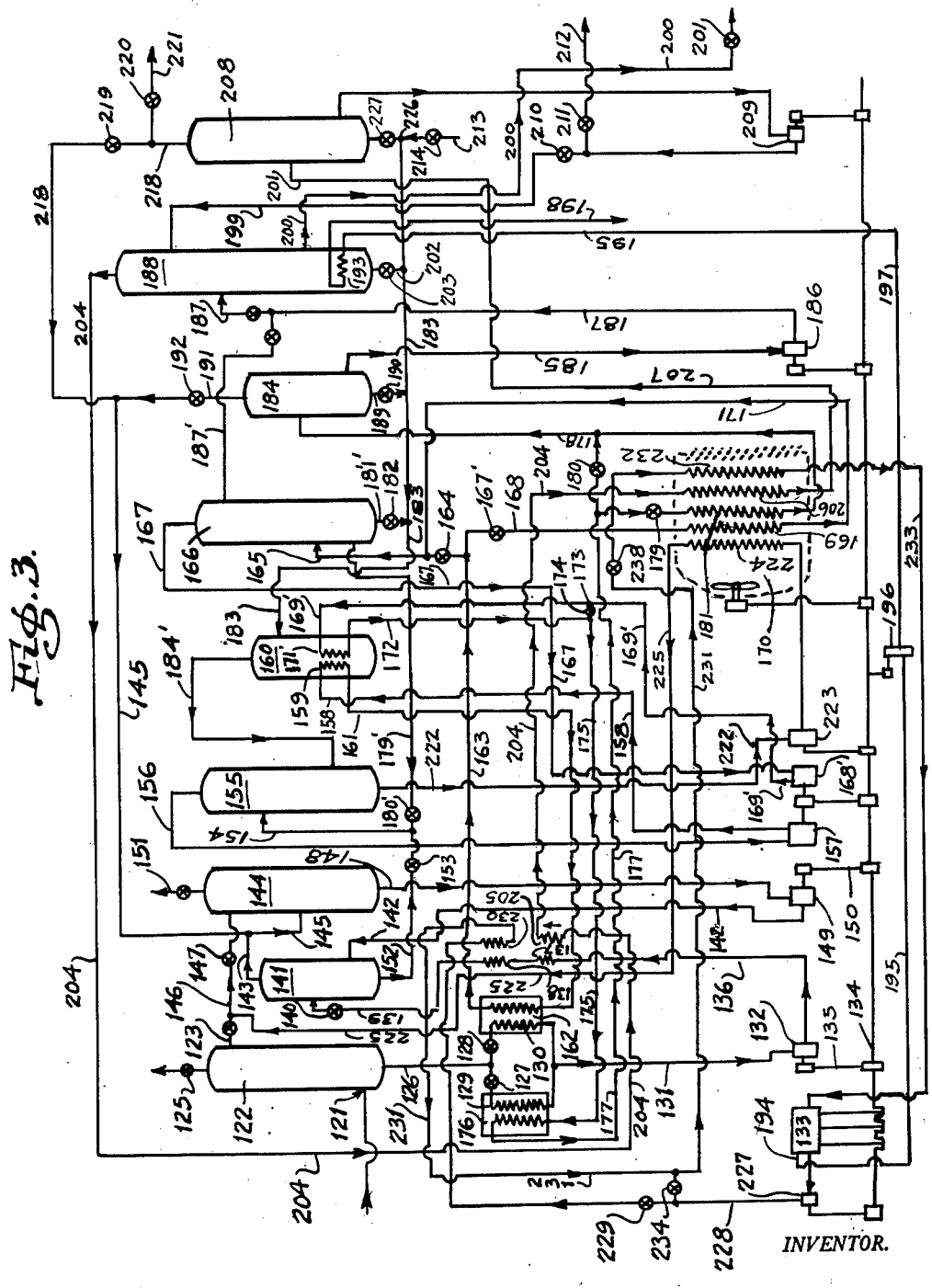

These and other objects of my invention will be further explained from the following description taken together with the drawings, in which Fig. 1 is a schematic flow sheet of one application of my invention to the absorption of gasoline and like vapors from fixed gases;

Figure 2:
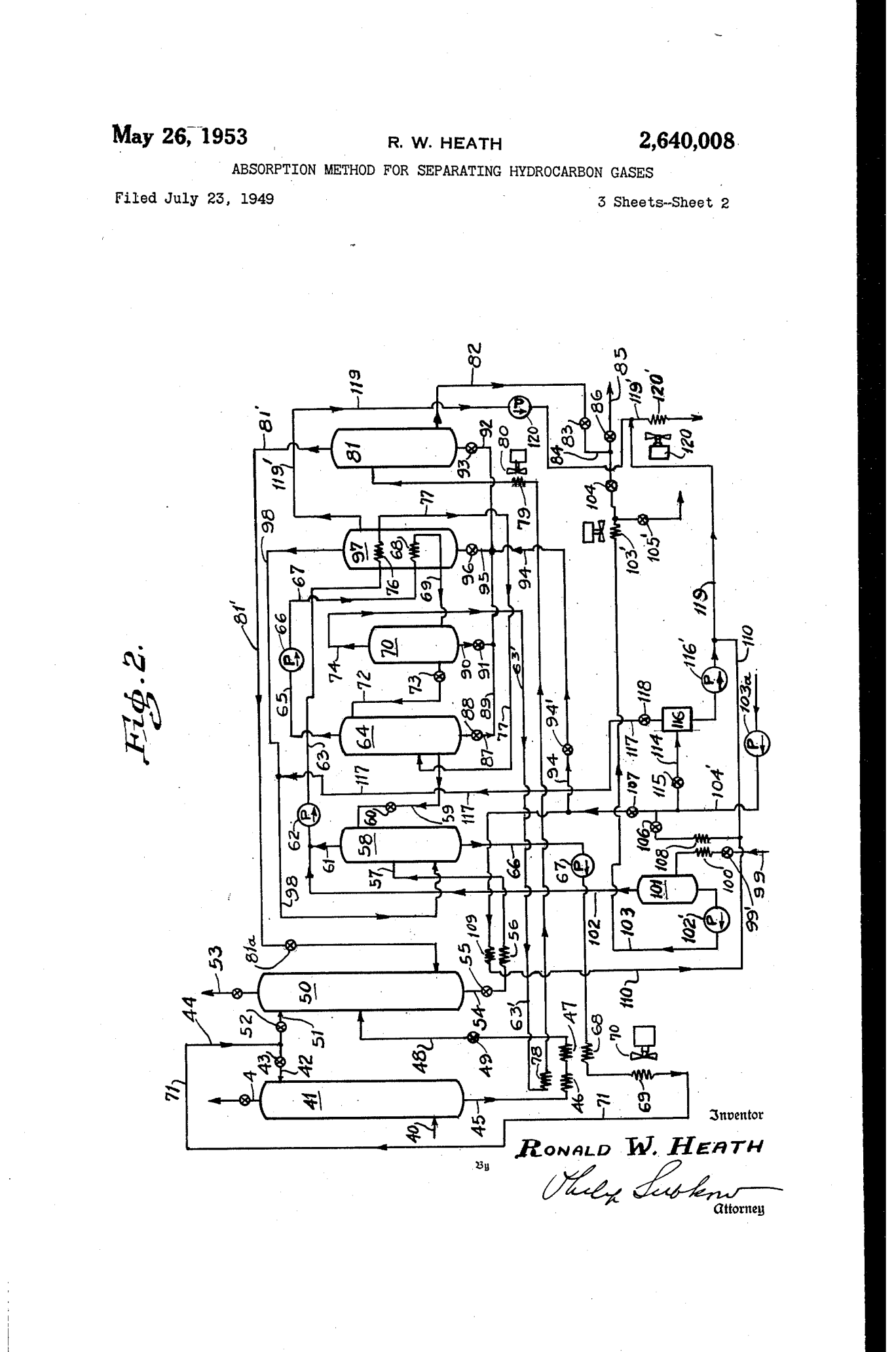

Fig. 2 is another form showing the application of my process to the separation of gasoline and like fractions from gases; and Fig. 3 is a flow sheet showing a modification of my process.

In Fig. 1 the inlet gases enter through 1 into absorber 2 to meet the stream of absorption oil introduced through line 3 and valve 3'. The unabsorbed gases exit through 4 for disposal as desired. The fat oil is withdrawn under autogenous pressure through line 5 where it may pass through line 6 and valve 6' into the reabsorber 7. The vented gas is withdrawn through 8 for disposal. The fat oil from the reabsorber is withdrawn through line 9 controlled by the valve 10 and in turn controlled by the float 11 responsive to the level of fluid in 7. The oil passing through valve 10 enters line 12 and into the vacuum still 13, in which it is stripped under vacuum. The vapor is withdrawn through 14 by means of vacuum pump 15. The unvaporized distilland is withdrawn through 16 by means of pump 17 into line 3 and into the absorber 2 and through line 19 and valve 19' into the reabsorber 7. Compressed vapors from vacuum compressor 15 enter into dephlegmator 24 via heat exchange coils 23 in evaporator 37. They enter through line 24' controlled by valve 20' into separator 24. Condensate passes under its own pressure into line 12 and through valve 12' into the still 13 to act as a reflux in the still 13. Water is withdrawn through line 25 and valve 26 to be introduced into the evaporator, as will be described below. Gasoline vapor and vapors of lighter fractions are withdrawn through line 21 by means of compressor 28 and passed through heat exchange coils 29 in the evaporator 37 and through line 30 and air cooler 30' into the condensate receiver 31. The uncondensed gases are withdrawn through valved line 32 and introduced into the reabsorber 7. The water condensate is withdrawn through line 33 and valve 33' and passed through line 34 controlled by valve 35 into line 36 via valve 36' and introduced into the evaporator 37 together with water passing via line 25. The steam generated in evaporator 37 passes through line 38 and valve 38' into the still 13. Condensate from 31 is withdrawn via line 27 and valve 27'. Added water make-up or excess water is bled from the system via 39 by control of valves 26, 36', 35 and 33'.

Illustrating the operation of this system, natural gas containing gasoline fractions which may include hexane, pentane, butane, propane, and lighter hydrocarbons, in which only the higher hydrocarbons, for example, pentane and the higher gasoline hydrocarbons are to be removed, is passed through 2 under a pressure of about 100 pounds per square inch absolute (p. s. i. a.) and is met with absorption oil introduced through 3. The fat oil is passed through pressure reduction valve 6' into the reabsorber 7 which operates, for example, at 30 p. s. i. a. and a temperature of 145° F. The temperature maintained in the still 13 is about 145° F., pressure being about 3 p. s. i. a.. The pressure maintained in the evaporator 37 is about 6 p. s. i. a. at which temperature the water will be vaporized at a temperature of 170° F. The latent heat of vaporization is supplied from the heat of the compressed gases passing through 29 and 23. For this purpose the vacuum pump compressor 15 comprises the vapors from a pressure of about 3 p. s. i. a. to a pressure sufficient to maintain 15 p. s. i. a. in the dephlegmator 24, and the vapors are heated to a temperature of about 400° F., whereupon they pass through heat exchange coil 23 and are introduced into 24 at a pressure of 15 p. s. i. a. and a temperature of about 185° F. The dephlegmator operating at 15 p. s. i. a. and at 185° F. results in separation of oil heavier than the gasoline hydrocarbons and the oil is recirculated via 12. Water is condensed and separated at a temperature of 185° F. and thus may be flashed into evaporator 37 via valves 26 and 36'.

The gasoline vapors from 24 may then be further compressed in compressor 28 to a pressure sufficient to maintain 75 p. s. i. a. in separator 31 and thus are heated by compression to a temperature of about 435° F. and passed through heat exchange coils 29 and air cooler 30' whereby the gasoline vapors are reduced in temperature to about 85° F. and introduced into the separator 31.

It will be observed that all of the latent heat of vaporization of the water vapor in 37 is obtained by heat exchange with the compressed steam which has been heated by such compression in 37.

The air cooling required is of stream at relatively high temperature levels and thus air cooling may be efficiently employed and atmospheric water cooling need not be employed.

In Fig. 2, the incoming gas is pumped through line 40 into absorber 41 where it meets absorption oil introduced through 42 from line 44 under the control of valve 43. The fat oil is withdrawn through 45 under its own pressure, passed through the heat exchange coils 46 (in exchange with coil 78) and 47 (in exchange with coil 68) and passed into the reabsorber 50 through line 48, controlled by valve 49, wherein it meets absorption oil introduced through line 51 under the control of valve 52. The released and unabsorbed gases are withdrawn through line 53 to disposal. The fat oil is withdrawn under its own pressure through line 54 under the control of valve 55, passed through the heat exchange coil 56 (in exchange with coil 109) and through line 57 into the vacuum still 58.

In the vacuum still, steam from line 98 is introduced into the still 58 and the vapors are refluxed with reflux introduced through line 59 under control of valve 60. The residue in 58 is withdrawn through line 66 by means of pump 67, passed through heat exchange coil 68 (in exchange with coil 47) and through the cooling coil 69 where it is cooled by a blast of air from the fan blower 70 and introduced through line 71 into line 44. The vapors from still 58 pass through line 61 into the vacuum compressor 62 and are pumped through line 63, heat exchange coil 76, and line 77 into the dephlegmator 64. The hydrocarbon oil condensate is withdrawn from the dephlegmator through line 59 and introduced as a reflux in 58.

The uncondensed vapors from the dephlegmator are passed through line 65 into the compressor 66 and through line 67 into the heat exchange coil 68 and from the heat exchange coil through line 69 into the condensate separator 70. Hydrocarbon condensate passes through line 72 under the control valve 73 to be introduced into 64 as reflux. The uncondensed vapors and gases pass through line 74 and pass through line 63' and the heat exchange coil 78 (in exchange with coil 46) and through the cooling coil 79 cooled by air from fan 80 into the condensate receiver 81.

The hydrocarbon distillate is withdrawn through line 82 under control of valve 83 into line 84 from which it may pass through line 85 under control of valve 86 to any desired storage or transportation system. The uncondensed fraction passes via line 81' and valve 81a into 50. The water condensate in the dephlegmator 64 is withdrawn through line 87 under control of valve 88 and passed into line 89 through which line is also passed the water condensate from 70 passing through line 90 controlled by valve 91. The water condensate from line 92 controlled by valve 93 passing from the condensate receiver 81 also passes into line 89. The combined streams in line 89, together with the stream circulating through line 94, from the engine cooling water supply passes through line 95 controlled by valve 96 into the evaporator 97. The steam generated in 97 passes through line 98 into the still 58.

Unstable crude oil containing gasoline and light fractions, such as propane and butane, if this is to be processed in the system, passes from the field tanks into line 99 controlled by valve 99', through the heat exchange coils 100 (in exchange with coil 108) into the evaporator 101 from which the vaporized material passes through line 102 into the intake of the compressor 62. The unvaporized fraction is withdrawn from evaporator 101 by pump 102' and passes through line 103 controlled by valve 104 and air cooler 105' to be commingled with the condensate withdrawn through 82, or it may be by-passed via the valved line 105' to storage.

The pumps and compressors are preferably operated by means of natural gas or other internal combustion engine in which, as is conventional, a supply of cooling water is circulated around the cylinders of the engine and thereby heated. The heated cooling water may be pumped by pump 103a through line 104'. It may be passed through valve 106 through the heat exchange coils 108 in heat exchange with coil 100 and introduced into the line 110. A portion may pass through valve 107, through coil 109, in heat exchange with coil 56, and through line 110 into line 119 and a portion or all of the hot water may pass through valved line 106 and heat exchange coil 108 (in exchange with coil 100) into line 110. A portion or all of the water from line 104' may pass through line 94 and valve 94' into line 95. The portion which is not so circulated, or all of the hot water, may pass through line 114 controlled by valve 115 into the evaporator 116. Vaporized steam passes through line 117 controlled by valve 118 and enters into line 98. Cooled water from the evaporator 116 is withdrawn through line 119 by pump 116' and passes along with the water from line 110 into line 119', whence it may be circulated to act as cooling water for the internal combustion engine. The unvaporized water in 97 may be withdrawn through line 119' by means of pump 120 and pumped into line 119.

The water in line 119 may be additionally cooled by passing through coil 120' and cooled by a blast of air from fan 120, and the finally cooled water may be passed for cooling of the internal combustion engine.

As an example of the operation of the above system, the following may be taken as illustrative and not as a limitation of my invention.

The gas entering via 40 at a temperature of 80° F. is washed with oil at a temperature of 125° F. and a pressure of 65 p. s. i. a. The fat oil via 45 is preheated in 46 and 47 and is introduced into the reabsorber 50 which is maintained at a pressure of 30 p. s. i. a. The still 58 is maintained at 3 p. s. i. a. and a temperature of 145° F. The unvaporized oil, cooled to 125° F. by heat exchange and air cooling, is returned to line 44. The pressure in the water evaporator 97 is at 4 p. s. i. a. and a temperature of 153° F. is maintained by transfer from the hot gases obtained by compression of the vapors by compressor 62 which raises the pressure of the vapors withdrawn from 58 to a pressure sufficient to maintain a pressure of 15 p. s. i. a. in 64, and heats the vapors to a temperature of about 400° F. The vapors entering the dephlegmator 64 are cooled to a temperature of about 170° F. by the heat exchange in coil 76. The vapors from the dephlegmator 64 are further compressed by compressor 66 to a pressure sufficient to maintain a pressure of 75 p. s. i. a. in 70 and are heated to a temperature of about 435° F. and passed through coil 68 in evaporator 97 and cooled to a temperature of about 175° F. and then introduced into the separator 70. The uncondensed vapors are withdrawn via 74 and are further cooled by heat exchange in 78 and air cooling in 79 to about 85° F. and introduced into the separator 81.

The hot water entering through pump 103a is at a temperature of about 180° F. and is cooled by heat exchange and by flash evaporation in 116 and 97 and further by heat exchange in 108 and 109 and cooler 120'. Steam generated by evaporation may be used as process steam in the system as indicated.

In Fig. 3 the natural gas containing gasoline passes through line 121 under pressure into the absorber 122 wherein it meets descending absorption oil introduced through line 123 controlled by valve 124. The stripped gases are discharged through valved line 125 for distribution or use. Fat oil passes from line 126 controlled by valves 127 and 128 to pass through the parallel heat exchange coils 129 and 130 and through line 131 to pump 132. The pump is operated through the medium of a natural gas internal combustion engine 133 and a power transmission system indicated schematically by the shaft 134 and belt transmission 135. Any type of power transmission from the internal combustion engine 133 to the pump 132 may be employed. Thus, for example, the engine 133 may operate a dynamo to generate current to drive the pumps and compressors.

The oil is passed from pump 132 through line 136 to the heat exchange coils 137 and 138 through line 139, and through valve 140 into the flash chamber 141. Into this flash chamber is also introduced, through line 142, oil from the reabsorber 144, as will be explained later. The flashed vapors pass through line 143 into line 145 and then into the reabsorber 144. Part of the oil passing through line 225 is passed by control of valve 147 through line 146 into the reabsorber 144.

The oil containing absorbed fractions is withdrawn from 144 through line 148 by the pump 149 operated by power transmission system 150 and 134 from the engine 133 and is pumped by this pump 149 into line 142. The stripped gases are discharged from the reabsorber through valved line 151. The partially stabilized oil in 141 passes under its own pressure through line 152 and the valve 153 into line 154 and thence into the still 155. The still operates at a vacuum. The vapors from the still pass through line 156 to the compressor 157 operated by means of the power transmission systems 134 from engine 133. The residue from the still 155 is withdrawn through line 222 by means of pump 223 (driven similarly from engine 133) and passed through cooling coil 224 positioned in the air cooler 170 (whose fan is driven by engine 133) and the oil is then circulated through line 225 into line 146.

The compressed vapors from the compressor 157 pass through line 158 through coil 159 positioned in the water evaporator 160, thence through line 161 through the heat exchange coil 162, in heat exchange with coil 130, thence through line 163, and by means of valve 164 into line 165, thence into the fractionating tower 166. If desired part or all of the vapors may be passed through valve 167', line 168, through the cooling coil 169 positioned in the air cooler 170, and by means of line 171 back to line 165. The air cooler will be more fully described later.

The uncondensed vapors and steam pass from 166 through line 167 into the second stage 168' of the compressor, then pass through line 169', to the coil 171' positioned in the water evaporator 160, thence through line 172. A portion or all of the hot compressed vapors passing through 169' may, controlled by valve 174, pass through line 175 commingled with the portion of any of the gases passing via line 172, and then through heat exchange coil 176 and heat exchanged with material passing through coil 129 and thence through line 177, through line 178. A portion or all of the material passing through line 177 may by the control of the valves 179 and 180 be passed in part or entirely through cooling coil 181 in the air cooler 170, thence through line 178 into the separator 184.

The condensate in 166 is separated in two parts, the hydrocarbon condensate lighter than water is withdrawn through line 179' under control of valve 180' and introduced into line 154. The water under its own pressure is withdrawn through line 181' and valve 182 and passed into line 183, thence into the water evaporator 160.

The steam generated in 160 passes directly through line 184' direct to the still 155 and introduced to aid in the steam distillation of 155.

The hydrocarbon condensate is withdrawn from 184 through line 185 by means of pump 186 operated by the engine 133 and pumped through line 187 into the stabilizer 188 and part passing through valved line 187' to act as a reflux in 166. The water condensate is withdrawn under its own pressure from the separator 184 through line 189 and valve 190 and introduced into line 183 and passed to the steam evaporator. The uncondensed gases are withdrawn through line 191 under control of valve 192 and passed into line 145 to be introduced into reabsorber 144.

The heat required in the stabilizer may be introduced by circulating exhaust gas from engine 133 through the exhaust manifold 194, line 195, and hot gas blower 196 operated from engine 133 and discharging through line 198 to atmosphere. If desired alternate forms of heating may be employed. However, by ultilizing the heat in the exhaust gases, a separate fired heater is avoided.

The gasoline is stabilized by rectifier 188 by means of a reflux introduced through line 199. The stabilized gasoline is withdrawn through line 200 controlled by valve 201 to storage. Any water condensate collecting in 188 resulting from any entrained water passing through 187 is separated by means of line 202, and valve 203 and passed through line 183 into the steam evaporator 160. The vapors passing from the top of 188 pass through line 204, thence through coil 205 in heat exchange with coil 137, thence through coil 206 in the air cooler 170 and through line 207 into separator 208.

The hydrocarbon fraction is withdrawn by pump 209 and passed through valve 210 in part as reflux through line 199, part through valve 211, through line 212 to any storage for liquid gas. Uncondensed gases may pass via line 218 and valve 219 to line 145 or passed to disposal via line 221 and valve 219.

Any water collecting in 208 may be passed through valve 227 and line 226 to join the water flowing in line 183 entering the evaporator 160. Make-up water may be added via line 213 and valve 214.

The cooling water circulating in the water jacket of the internal combustion engine 133 is passed by pump 227 through line 228. Part may be passed through valve 229 through heat exchange coil 230 in heat exchange with coil 138, thence by adjustment of valves 229 and 234 through line 231 and valve 238 through the cooling coil 232 in cooler 170 and through line 233 to the jacket of 133. A portion of the water from 228 may be by-passed, if desired, through valve 234 into line 231.

Illustrating the operation of this system (Fig. 3) the following example may be taken by way of illustration of the principle of the operation, and not as a limitation.

The input natural gases containing gasoline and lighter fractions via 121 enter at a temperature of about 80° F. and the absorber 122 operates at a top temperature of about 125° F. and at a pressure of 65 p. s. i. a. The reabsorber 144 operates at a pressure of 25 p. s. i. a. and at a top temperature of 125° F. The flash chamber 141 operates at a pressure of the reabsorber and a temperature of 160° F. The still 155 operates at 150° F. and 3 p. s. i. a. The steam evaporator operates at a pressure of 4.5 p. s. i. a. with a water temperature of 158° F. If part of the coils 159 and 171' are in the vapor space, the steam may be superheated above 158° F. by contact with hot coils. The vapors from still 155 via line 156 are compressed in 157 to a pressure such as to obtain 15 p. s. i. a. in 166 and are heated by this compression to a temperature of about 405° F. and are cooled to a temperature of about 170° F. in passing through coils 159 and further cooled to a temperature of about 120° F. in heat exchange coils 162 and cooling coils 169. The vapors from 166 via 167 are compressed to a pressure sufficient to maintain 100 p. s. i. a. in 184 and heated to a temperature of 400° F., and by passing through the compressor 168' and then by passage through coils 171' and heat exchange coils 176 and 181 are cooled to a temperature of 120° F. and are introduced into the separator 184.

The heat of the vapors in 159 and 171 is sufficient to vaporize the water at the rate at which the water is circulated via line 183 so that a constant steam rate and water level are maintained in 160.

The stabilizer is operated at a pressure of 380 p. s. i. a. with a top temperature of 160° F., and with bottom temperature of 350° F. obtained from the exhaust gases which circulate at a temperature of about 700° F.

The engine water is removed from the engine at a temperature of about 176° F. and passes through coil 230 and is further cooled in 232 to a temperature of 166° F. It will be observed that all heat requirements are obtained from the work done by the internal combustion engine which operates on waste natural gas and that the cooling in the air cooler is at a high temperature level wherein the air cooler may operate efficiently.

While I have described a particular embodiment of my invention for the purpose of illustration, it should be understood that various modifications and adaptations thereof may be made within the spirit of the invention as set forth in the appended claims.

I claim:

1. A process for separation of light liquid hydrocarbons from gases containing the same, which comprises passing such gases into an absorption zone in contact with an absorption oil wherein such liquid hydrocarbons are absorbed by said oil in an absorption zone operating under super-atmospheric pressure, separating fat oil containing such absorbed liquid hydrocarbons from the unabsorbed gases, introducing said fat oil into a steam distillation zone maintained at a sub-atmospheric pressure, vaporizing a portion of the fat oil in the still and thus cooling the oil, removing the hydrocarbon vapors containing steam from the unvaporized residue, compressing the mixed vapors above the pressure at which distillation occurred, heating said mixed vapors by such compression above the temperature of said distillation, cooling said mixed vapors to partially condense the hydrocarbon vapors and to condense water from said mixed vapors at said higher pressure, separating the condensed water from the uncondensed hydrocarbon vapors and further cooling said uncondensed hydrocarbon vapors to condense said vapors, reducing the pressure on said water to substantially the pressure of said distillation and passing said water in indirect heat exchange with the compressed vapors, thus cooling said vapors, vaporizing said water at said lower pressure to form steam, introducing said steam into said distillation zone, and withdrawing the unvaporized oil from said distillation zone and pumping the same to the absorption zone.

2. A process for separation of light liquid hydrocarbons from gases containing the same, which comprises passing such gases into an absorption zone under super-atmospheric pressure in contact with an absorption oil wherein such liquid hydrocarbons are absorbed by said oil, separating fat oil containing such absorbed liquid hydrocarbons from the unabsorbed gases, introducing said fat oil into a steam distillation zone maintained at a sub-atmospheric pressure substantially lower than the absorption zone, vaporizing a portion of the fat oil in the still and thus cooling said oil, removing hydrocarbon vapors containing steam from the unvaporized residue, compressing said mixed vapors above the pressure at which distillation occurred, heating said mixed vapors by such compression above the temperature of said distillation, cooling said mixed vapors by indirect heat exchange with water and vaporizing said water in a vaporizing zone at a pressure substantially that of said distillation zone, to form steam, introducing said steam into said distillation zone, cooling said mixed vapors and condensing water vapor and partially condensing hydrocarbon vapors from the hydrocarbon condensate and water at a pressure substantially higher than is maintained in said water vaporizing zone, separating said condensed water and hydrocarbon condensate from the uncondensed vapors, reducing the pressure on said water, further cooling said uncondensed vapors and condensing hydrocarbons therefrom, introducing said water into said water vaporizing zone, and withdrawing the unvaporized oil from said distillation zone at a temperature less than the temperature of the fat oil withdrawn from the absorption zone, and pumping the same to the absorption zone.

3. A process for separation of light liquid hydrocarbons from gases containing the same, which comprises passing such gases into an absorption zone under super-atmospheric pressure in contact with an absorption oil wherein such liquid hydrocarbons are absorbed by said oil, separating fat oil containing such absorbed liquid hydrocarbons from the unabsorbed gases, introducing said fat oil into a steam distillation zone maintained at a sub-atmospheric pressure, vaporizing a portion of the fat oil in the still and thus cooling the oil, removing vapors containing steam from the unvaporized residue, compressing said mixed vapors above the pressure at which distillation occurred, heating said mixed vapors by such compression above the temperature of said distillation, passing said compressed vapors in indirect heat exchange with a water maintained in a vaporizing zone at a pressure substantially that of said distillation zone, cooling said vapors and vaporizing said water to form steam, introducing said steam into said distillation zone, cooling said mixed vapors and condensing water vapor and partially condensing hydrocarbon vapors from said cooled vapors at a pressure and temperature substantially higher than is maintained in said water vaporizing zone, separating said condensed water from the uncondensed hydrocarbon vapors and further cooling said hydrocarbon vapors to further condense hydrocarbons therefrom, reducing the pressure on said water, introducing said water into said water vaporizing zone, and withdrawing the unvaporized oil from said distillation zone at a temperature less than the temperature of the fat oil withdrawn from the absorption zone, and pumping the same to the absorption zone.

4. A process for separation of light liquid hydrocarbons from gases containing the same, which comprises passing such gases into an absorption zone in contact with an absorption oil under super-atmospheric pressure wherein such liquid hydrocarbons are absorbed by said oil, separating fat oil containing such absorbed liquid hydrocarbons from the unabsorbed gases, introducing said fat oil into a steam distillation zone maintained at a sub-atmospheric pressure, vaporizing a portion of the fat oil in the still and thus cooling the oil, removing hydrocarbon vapors mixed with water vapors from the unvaporized residue, compressing the mixed vapors to a pressure substantially higher than the pressure in said vaporizing zone, heating the vapors by such compression, passing the compressed vapors in heat exchange with water in a water vaporizing zone maintained at a pressure substantially that of the distillation zone to cool the vapors and to supply latent heat of vaporization of the water, condensing a portion of the compressed vapors, separating condensate from the uncondensed vapors at such higher pressure, further compressing said uncondensed vapors to a higher pressure and thus further heating said vapors by such compression, passing said further compressed vapors in heat exchange with said water in said vaporizing zone to further supply latent heat of vaporization of said water in said vaporizing zone and to cool the further compressed vapors, condensing water and partially condensing the hydrocarbon vapors from said further compressed vapors at such higher pressure, separating such water condensate from the uncondensed vapors at such higher pressure, further cooling the uncondensed vapors and condensing hydrocarbons therefrom reducing the pressure on said water condensate, introducing such water at such reduced pressure into said water vaporizing zone, and removing the unvaporized oil from said distillation zone at a temperature less than the temperature of the fat oil withdrawn from the absorption zone, and pumping the same to the absorption zone.

5. A process for separation of light liquid hydrocarbons from gases containing the same, which comprises passing such gases into an absorption zone under super-atmospheric pressure in contact with an absorption oil wherein such liquid hydrocarbons are absorbed by said oil, separating fat oil containing such absorbed liquid hydrocarbons from the unabsorbed gases, introducing said fat oil into a steam distillation zone maintained at a sub-atmospheric pressure, vaporizing a portion of the fat oil in the still and thus cooling the oil, removing the hydrocarbon vapors containing steam from the unvaporized residue, compressing the mixed vapors above the pressure at which distillation occurred, heating said mixed vapors by such compression above the temperature of said distillation, cooling said mixed vapors to condense water from said vapors and partially condensing the hydrocarbon vapors at said higher pressure, separating water from the uncondensed vapors, further cooling the uncondensed vapors to condense hydrocarbons therefrom, reducing the pressure on said water to substantially the pressure of said distillation and passing said water in heat exchange with the compressed vapors, cooling said vapors, vaporizing said water at said lower pressure to form steam, introducing said steam into said distillation zone, withdrawing the unvaporized oil from said distillation zone and pumping the cooled oil to the absorption zone, operating said compression and said pumps by connecting the said compression and pumps to an internal combustion engine, passing water to cool said engine, circulating the hot water from said engine and passing the same in heat exchange with the fat oil passing from the absorption zone to the distillation zone and thus heating said fat oil, and returning the cooled water to the internal combustion engine.

6. A process for separation of light liquid hydrocarbons from gases containing the same, which comprises passing such gases into an absorption zone under super-atmospheric pressure in contact with an absorption oil wherein such liquid hydrocarbons are absorbed by said oil, separating fat oil containing such absorbed liquid hydrocarbons from the unabsorbed gases, introducing said fat oil into a steam distillation zone maintained at a sub-atmospheric pressure, vaporizing a portion of the fat oil in the still and thus cooling the oil, removing the hydrocarbon vapors containing steam from the unvaporized residue, compressing the mixed vapors above the pressure at which distillation occurred, heating said mixed vapors by such compression above the temperature of said distillation, cooling said mixed vapors to condense water from said vapors and partially condensing the hydrocarbon vapors at said higher pressure, separating water from the uncondensed vapors, further cooling the uncondensed vapors to condense hydrocarbons therefrom, reducing the pressure on said water to substantially the pressure of said distillation and passing said water in heat exchange with the compressed vapors, cooling said vapors, vaporizing a portion of said water at said lower pressure to form steam, leaving some water unvaporized, introducing said steam into said distillation zone, passing said unvaporized water in contact with said compressed vapors, withdrawing the unvaporized oil from said distillation zone and pumping the cooled oil to the absorption zone, operating said compression and said pumps by connecting the said compression and pumps to an internal combustion engine, passing water to cool said engine, circulating the hot water from said engine and passing the same in heat exchange with the fat oil passing from the absorption zone to the distillation zone and thus heating said fat oil, and returning the cooled water to the internal combustion engine.

7. A process for separation of light liquid hydrocarbons from gases containing the same, which comprises passing such gases into an absorption zone under super-atmospheric pressure in contact with an absorption oil wherein such liquid hydrocarbons are absorbed by said oil, separating fat oil containing such absorbed liquid hydrocarbons from the unabsorbed gases, introducing said fat oil into a steam distillation zone maintained at a sub-atmospheric pressure, vaporizing a portion of the fat oil in the still and thus cooling the oil, removing hydrocarbon vapors containing steam from the undistilled residue, compressing said mixed vapors above the pressure at which distillation occurred, heating said mixed vapors by such compression above the temperature of said distillation, cooling said mixed vapors by indirect heat exchange with a water maintained in a vaporizing zone at a pressure substantially that of said distillation zone, cooling said vapors and vaporizing said water to form steam, introducing said steam into said distillation zone, condensing water and partially condensing hydrocarbons from said cooled vapors at a pressure substantially higher than is maintained in said water vaporizing zone, separating said condensed water from uncondensed hydrocarbon vapors and further cooling the uncondensed hydrocarbon vapors to condense hydrocarbons therefrom, reducing the pressure on said water, introducing said water into said water vaporizing zone, withdrawing the unvaporized oil from said distillation zone, cooling said separated oil by indirect heat exchange with circulated air and pumping the said cooled oil to the absorption zone, operating said compression and said pumps by connecting the said compression and pumps to an internal combustion engine, passing water to cool said engine, circulating the hot water from said engine and passing the same in heat exchange with the fat oil passing from the absorption zone to the distillation zone and thus heating said fat oil, and returning the cooled water to the internal combustion engine.

8. A process for separation of light liquid hydrocarbons from gases containing the same, which comprises passing such gases into an absorption zone under super-atmospheric pressure in contact with an absorption oil wherein such liquid hydrocarbons are absorbed by said oil, separating fat oil containing such absorbed liquid hydrocarbons from the unabsorbed gases, introducing said fat oil into a steam distillation zone maintained at a sub-atmospheric pressure, vaporizing a portion of the fat oil in the still and thus cooling the oil; removing hydrocarbon vapors containing steam from the undistilled residue, compressing said mixed vapors above the pressure at which distillation occurred, heating said mixed vapors by such compression above the temperature of said distillation, cooling said mixed vapors by indirect heat exchange with a water maintained in a water vaporizing zone at a pressure substantially that of said distillation zone, and thereby cooling said mixed vapors and vaporizing said water to form steam, and also partially condensing the mixed vapors to form a steam condensate at a pressure substantially higher than is maintained in said water vaporizing zone, introducing the uncondensed vapors into a separating zone, separating the uncondensed vapors from the condensate formed therefrom in the separating zone, separately withdrawing said condensed water and uncondensed hydrocarbons from said separating zone, cooling the hydrocarbon vapors to condense hydrocarbons therefrom, reducing the pressure on said water, introducing said water into said water vaporizing zone, withdrawing the unvaporized oil from said distillation zone, cooling the withdrawn unvaporized oil by heat exchange with circulated air, and pumping the same to the absorption zone, operating said compression and said pumps by connecting the said compression and pumps to an internal combustion engine, passing water to cool said engine, circulating the hot water from said engine and passing the same in heat exchange with the fat oil passing from the absorption zone to the distillation zone and thus heating said fat oil, and returning the cooled water to the internal combustion engine.

9. A process for separation of light liquid hydrocarbons from gases containing the same, which comprises passing such gases into an absorption zone under super-atmospheric pressure in contact with an absorption oil wherein such liquid hydrocarbons are absorbed by said oil, separating fat oil containing such absorbed liquid hydrocarbons from the unabsorbed gases, introducing said fat oil into a steam distillation zone maintained at a sub-atmospheric pressure, vaporizing a portion of the fat oil in the still and thus cooling the oil, removing hydrocarbon vapors of said material mixed with water vapors from the unvaporized residue, compressing the mixed vapors to a pressure substantially higher than the pressure in said vaporizing zone, heating the vapors by such compression, passing the compressed vapors in heat exchange with water in a water vaporizing zone maintained at a pressure substantially that of the distillation zone to cool the vapors and to supply latent heat of vaporization of the water, condensing a portion of the compressed vapors, separating condensate from the uncondensed vapors at such higher pressure, further compressing said uncondensed vapors to a higher pressure and thus further heating said vapors by such compression, passing said further compressed vapors in heat exchange with said water in said vaporizing zone to further supply latent heat of vaporization of said water in said vaporizing zone and to cool the further compressed vapors, condensing water from said further compressed vapors at such higher pressure, separating such water condensate from the uncondensed vapors at such higher pressure, further cooling the said uncondensed vapors and condensing hydrocarbons therefrom, reducing the pressure on said water condensate, introducing such water at such reduced pressure into said water vaporizing zone, withdrawing the unvaporized oil from said distillation zone and pumping the same to the absorption zone, operating said compression and said pumps by connecting the said compression and pumps to an internal combustion engine, passing water to cool said engine, circulating the hot water from said engine and passing the same in heat exchange with the fat oil passing from the absorption zone to the distillation zone and thus heating said fat oil, and returning the cooled water to the internal combustion engine.

10. A process for separation of light liquid hydrocarbons from gases containing the same, which comprises passing such gases into an absorption zone at super-atmospheric pressure in contact with an absorption oil wherein such liquid hydrocarbons are absorbed by said oil, separating fat oil containing such absorbed liquid hydrocarbons from the unabsorbed gases, introducing said fat oil into a steam distillation zone maintained at a sub-atmospheric pressure, vaporizing a portion of the fat oil in the still and thus cooling the oil, removing hydrocarbon vapors mixed with water vapors from the unvaporized residue, compressing the mixed vapors to a pressure substantially higher than the pressure in said vaporizing zone, heating the vapors by such compression, passing the compressed vapors in heat exchange with water in a water vaporizing zone maintained at a pressure substantially that of the distillation zone to cool the vapors and to supply latent heat of vaporization of the water, condensing a portion of the compressed vapors, separating condensate from the uncondensed vapors at such higher pressure, further compressing said uncondensed vapors to a higher pressure and thus further heating said vapors by such compression, removing water from said water vaporizing zone, heating said water with the further compressed vapors to cool the same, condensing water from said further compressed vapors at such higher pressure, separating such water condensate from the uncondensed vapors at such higher pressure, reducing the pressure on said water condensate, introducing such water at such reduced pressure into said water vaporizing zone, withdrawing the unvaporized oil from said distillation zone and pumping the same to the absorption zone.

11. A process for separation of light liquid hydrocarbons from gases containing the same, which comprises passing such gases into an absorption zone under super-atmospheric pressure in contact with an absorption oil wherein such liquid hydrocarbons are absorbed by said oil, separating fat oil containing such absorbed liquid hydrocarbons from the unabsorbed gases, introducing said fat oil into a steam distillation zone maintained at a sub-atmospheric pressure, vaporizing a portion of the fat oil in the still and thus cooling the oil, removing the hydrocarbon vapors containing steam from the undistilled residue, compressing the mixed vapors above the pressure at which distillation occurred, heating said mixed vapors by such compression above the temperature of said distillation, cooling said mixed vapors to condense water and partially condense hydrocarbons from said vapors at said higher pressure, separating and removing condensed water and further cooling and condensing the uncondensed hydrocarbons, reducing the pressure on said water to substantially the pressure of said distillation, vaporizing said water at said lower pressure to form steam, introducing said steam into said distillation zone, and removing the undistilled oil from said distillation zone at a temperature less than the temperature of the fat oil withdrawn from the absorption zone, and pumping the same to the absorption zone.

12. A process for separation of light liquid hydrocarbons from gases containing the same, which comprises passing such gases into an absorption zone under super-atmospheric pressure in contact with an absorption oil wherein such liquid hydrocarbons are absorbed by said oil, separating fat oil containing such absorbed liquid hydrocarbons from the unabsorbed gases, introducing said fat oil into a steam distillation zone maintained at a sub-atmospheric pressure, vaporizing a portion of the fat oil in the still and thus cooling the oil, removing the vapors containing steam from the undistilled residue, compressing the mixed vapors above the pressure at which distillation occurred, heating said mixed vapors by such compression above the temperature of said distillation, cooling said mixed vapors to condense water and partially condense hydrocarbons from said vapors at said higher pressure, separating and removing the water and uncondensed hydrocarbons from said vapors and further cooling and condensing the hydrocarbons, reducing the pressure on said water to substantially the pressure of said distillation, vaporizing a portion of said water at said lower pressure to form steam, leaving some water unvaporized, introducing said steam into said distillation zone, passing said unvaporized water in heat exchange with said compressed vapors, and withdrawing the unvaporized oil from said distillation zone and pumping the same to the absorption zone.

13. A process for separation of light liquid hydrocarbons from gases containing the same, which comprises passing such gases into an absorption zone in contact with an absorption oil under pressure wherein such liquid hydrocarbons are absorbed by said oil, separating fat oil containing such absorbed liquid hydrocarbons from the unabsorbed gases, introducing said fat oil into a steam distillation zone maintained at a substantially lower pressure than in the absorption zone, vaporizing a portion of the fat oil in the still and thus cooling the oil, removing vapors containing steam from the undistilled residue, compressing said mixed vapors above the pressure at which said distillation occurred, heating said mixed vapors by such compression above the temperature of distillation, cooling said mixed vapors, vaporizing said water to form steam, introducing said steam into said distillation zone, condensing water and partially condensing the hydrocarbons from said cooled vapors at a pressure substantially higher than is maintained in said water vaporizing zone, separating said condensed water and hydrocarbons from the vapors and further cooling and condensing said vapors, reducing the pressure on said water, introducing said water into said water vaporizing zone, and removing the unvaporized oil from said distillation zone at a temperature less than the temperature of the fat oil withdrawn from the absorption zone, and pumping the same to the absorption zone.

14. A process for separation of light liquid hydrocarbons from gases containing the same, which comprises passing such gases into an absorption zone in contact with an absorption oil under pressure wherein such liquid hydrocarbons are absorbed by said oil, separating fat oil containing such absorbed liquid hydrocarbons from the unabsorbed gases, introducing said fat oil into a steam distillation zone maintained at a substantially lower pressure than in the absorption zone, vaporizing a portion of the fat oil in the still and thus cooling the oil, removing hydrocarbon vapors containing steam from the undistilled residue, compressing said mixed vapors above the pressure at which distillation occurred, heating said mixed vapors by such compression above the temperature of said distillation, cooling said mixed vapors, vaporizing water to form steam in a water vaporizing zone, partially condensing said mixed vapors to form a steam condensate and a hydrocarbon condensate at a pressure substantially higher than is maintained in said water vaporizing zone, introducing the uncondensed mixed vapors into a condensation zone, commingling the steam condensate with the water in said steam vaporizing zone, separating said condensed water, reducing the pressure on said water, introducing said water into said water vaporizing zone, and withdrawing the unvaporized oil from said distillation zone, at about the temperature of said absorption zone, and pumping the same to the absorption zone.

15. A process for separation of light liquid hydrocarbons from gases containing the same, which comprises passing such gases into an absorption zone under super-atmospheric pressure in contact with an absorption oil wherein such liquid hydrocarbons are absorbed by said oil, separating fat oil containing such absorbed liquid hydrocarbons from the unabsorbed gases, introducing said fat oil into a steam distillation zone maintained at a sub-atmospheric pressure, vaporizing a portion of the fat oil in the still and thus cooling the oil, removing vapors containing steam from the undistilled residue, compressing said mixed vapors above the pressure at which distillation occurred, heating said mixed vapors by such compression above the temperature of said distillation, cooling said mixed vapors by indirect heat exchange with water and cooling said compressed vapors, and partially vaporizing said water at a pressure substantially that of said distillation zone, to form steam, separating uncondensed water from the generated steam in a steam separating zone, condensing water and partially condensing the hydrocarbons from said cooled vapors at a pressure and temperature substantially higher than is maintained in said water vaporizing zone, separating said condensed water and condensed hydrocarbons from uncondensed mixed vapors, reducing the pressure on said water, passing said water in heat exchange with compressed vapors, further compressing the uncondensed mixed vapors, passing the same in heat exchange with the said water and further condensing hydrocarbon gases from said compressed and cooled mixed vapors, passing said generated steam into the distillation zone, and removing the unvaporized oil from said distillation zone at a temperature less than the temperature of the fat oil withdrawn from the absorption zone, and pumping the same to the absorption zone.

RONALD W. HEATH.

References Cited in the file of this patent

UNITED STATES PATENTS

| Number | Name | Date |
|---|---|---|
| 1,489,009 | Rohmer et al. | Apr. 1, 1924 |
| 1,565,749 | Mossor | Dec. 15, 1925 |
| 1,937,871 | Cox | Dec. 5, 1933 |
| 2,184,596 | Hutchinson | Dec. 26, 1939 |
| 2,345,934 | Gregory | Apr. 4, 1944 |
| 2,389,064 | Latham | Nov. 13, 1945 |

OTHER REFERENCES

Wentworth et al., Trans. Am. Inst. of Chemical Engineers, vol. 39, pp. 565–576 (1943).